US012728981B1

(12) United States Patent
Cross

(10) Patent No.: US 12,728,981 B1
(45) Date of Patent: Sep. 8, 2026

(54) FOLDING WING AIRCRAFT

(71) Applicant: Ryan Joseph Cross, Tempe, AZ (US)

(72) Inventor: Ryan Joseph Cross, Tempe, AZ (US)

( * ) Notice: Subject to any disclaimer, the term of this patent is extended or adjusted under 35 U.S.C. 154(b) by 0 days.

(21) Appl. No.: 19/402,316

(22) Filed: Nov. 26, 2025

Related U.S. Application Data

(60) Provisional application No. 63/726,961, filed on Dec. 2, 2024.

(51) Int. Cl.
*B64C 3/56* (2006.01)
*B64C 39/06* (2006.01)

(52) U.S. Cl.
CPC .............. *B64C 3/56* (2013.01); *B64C 39/068* (2013.01)

(58) Field of Classification Search
CPC ............ B64C 39/068; B64C 3/40; B64C 3/56
See application file for complete search history.

(56) References Cited

U.S. PATENT DOCUMENTS 1,309,961 A * 7/1919 Rippenbein ............... B64C 3/40 244/46
3,834,654 A * 9/1974 Miranda ............... B64C 39/068 244/45 R
4,053,125 A * 10/1977 Ratony ................. B64C 39/068 244/45 R
4,541,593 A * 9/1985 Cabrol .................. B64C 39/068 244/45 R
5,078,339 A * 1/1992 Lapidot ................. B64C 39/068 244/3.28
5,615,846 A * 4/1997 Shmoldas ............. F42B 15/105 244/3.28
6,986,481 B2 * 1/2006 Fanucci .................... B64C 3/40 244/46
7,841,559 B1 11/2010 O'Shea
8,444,082 B1 * 5/2013 Foch ..................... B64C 23/072 244/49
9,079,663 B2 * 7/2015 Sommer ................... B64C 5/04
9,108,713 B2 * 8/2015 Tao ......................... B64C 11/00
9,187,184 B2 * 11/2015 Miralles ................ B64C 39/024
10,280,904 B2 * 5/2019 Larson ...................... B64C 3/40
11,180,252 B2 * 11/2021 Varigas ..................... B64C 3/38
(Continued)

FOREIGN PATENT DOCUMENTS

WO WO-2008010226 A1 * 1/2008 ............... B64C 3/56

OTHER PUBLICATIONS

R2-120 Raijin—FLY-R Unmanned Aircraft Systems https://www.flyr-uas.com/en/r2-120-raijin Nov. 26, 2025 6 pages.

*Primary Examiner* — Joshua J Michener
*Assistant Examiner* — Michael B. Kreiner
(74) *Attorney, Agent, or Firm* — Plager Schack LLP; Mark H. Plager; Robert K. Roth

(57) ABSTRACT

A folding wing aircraft having a deployed position and a stowed position comprises a fuselage having a front and a back, and a top and a bottom, a first top wing and a second top wing, wherein the first top wing and the second top wing are pivotable about a top pivot pin, wherein the top pivot pin is positioned on the top of the fuselage. The folding wing aircraft also has a first bottom wing and a second bottom wing, wherein the first bottom wing and the second bottom wing are pivotable about a bottom pivot pin, wherein the bottom pivot pin is affixed to the bottom of the fuselage. A distance between the top pivot pin and the bottom pivot pin is fixed during movement from the stowed position to the deployed position.

6 Claims, 4 Drawing Sheets

(56) References Cited

U.S. PATENT DOCUMENTS

| | | | | |
|---|---|---|---|---|
| 11,731,760 | B2 | 8/2023 | Varigas | |
| 11,820,503 | B2 * | 11/2023 | Grimm | B60F 5/02 |
| 2019/0248480 | A1 * | 8/2019 | Whitten, Jr. | B64C 27/28 |

* cited by examiner 44
100
12
16
6
8
21
12
4
16
2
9
4
41
4
11
11
3
103
43

12
13
17
31
32
16
21
11
103

12
31
21
19
17
18
32
11
13
5
103

FOLDING WING AIRCRAFT

RELATED APPLICATION

This patent application claims priority benefit of U.S. Provisional Patent Application No. 63/726,961, filed on Dec. 2, 2024, the entire contents of which is herein incorporated by reference.

BACKGROUND OF THE INVENTION

Conventional aircraft typically have fixed wings and therefore take up a large area for storage. Such storage issues become problematic where it is desirable to make use of many aircraft, such as for emergency response, reconnaissance, military missions, etc. U.S. Pat. No. 7,841,559 to O'Shea discloses an aerial vehicle with a pair of wings on top of a fuselage and a pair of wings on the bottom of the fuselage. The wings are foldable, resulting in reduced storage area. However, the aircraft design disclosed requires a run channel in the fuselage, which increases manufacturing costs, as well as producing drag and eddies when in flight.

It would be desirable to provide a folding wing aircraft with a reduced storage position footprint with enhanced stability, reduced aerodynamic drag, and relatively low manufacturing costs.

SUMMARY OF THE INVENTION

In accordance with a first aspect, a folding wing aircraft having a deployed position and a stowed position comprises a fuselage having a front and a back, and a top and a bottom, a first top wing and a second top wing, wherein the first top wing and the second top wing are pivotable about a top pivot pin, wherein the top pivot pin is positioned on the top of the fuselage. The folding wing aircraft also has a first bottom wing and a second bottom wing, wherein the first bottom wing and the second bottom wing are pivotable about a bottom pivot pin, wherein the bottom pivot pin is affixed to the bottom of the fuselage. A distance between the top pivot pin and the bottom pivot pin is fixed during movement from the stowed position to the deployed position.

DETAILED DESCRIPTION OF CERTAIN EMBODIMENTS

In the following detailed description of the invention, numerous details, examples, and embodiments of the invention are described. However, it will be clear to those skilled in the art that the invention disclosed herein is not limited to the embodiments set forth and that the invention can be adapted for any of several applications. This list of possible constituent elements is intended to be exemplary only, and it is not intended that this list be used to limit the present application to just these elements. Persons having ordinary skill in the art given the present disclosure may understand there to be equivalent elements that may be substituted within the present disclosure without changing the essential function or operation of the device. The various elements of the device of the present disclosure may be related in the following exemplary fashion. It is not intended to limit the scope or nature of the relationships between the various elements and the following examples are presented as illustrative examples only.

Figure 1:
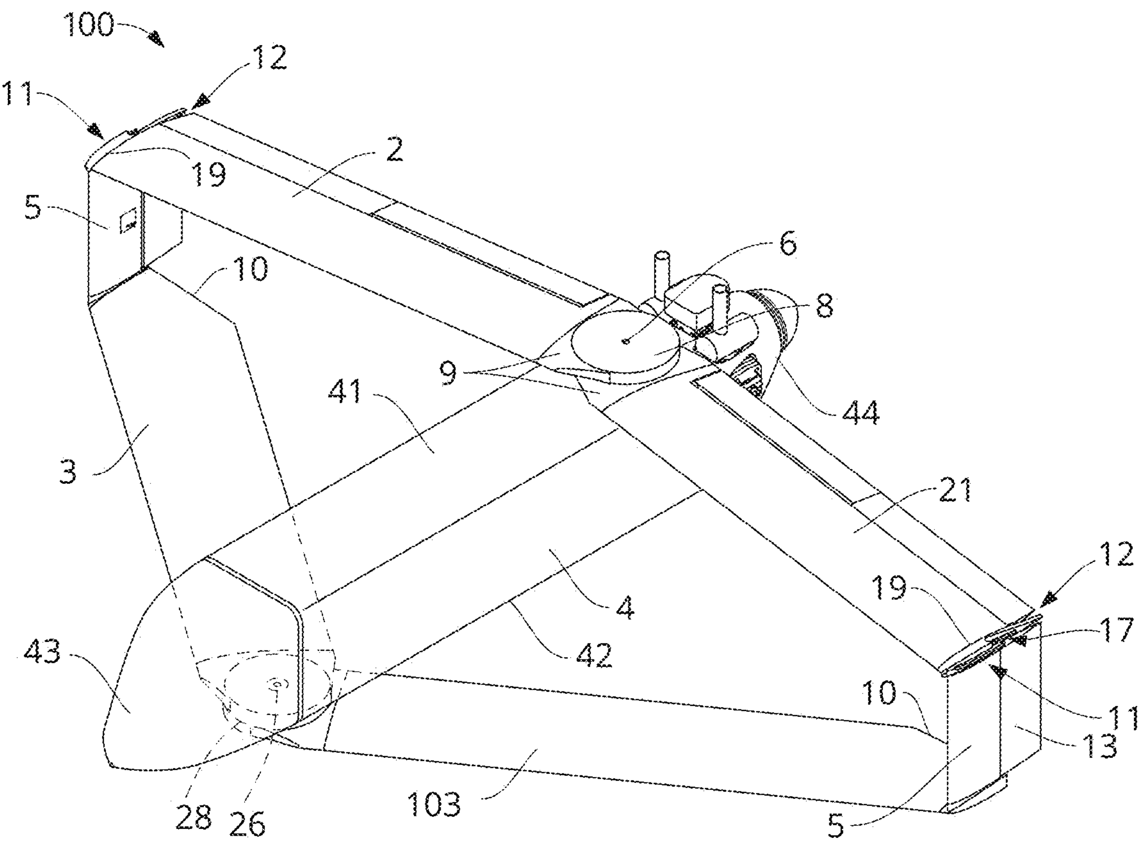
FIG. 1 is an isometric view of a folding wing aircraft in a deployed position, in accordance with one embodiment.

Turning now to the drawings, FIG. 1 shows a schematic of an aircraft 100 in a deployed position and movable to a stowed position. The aircraft has a pair of top wings 2, 21, and a pair of bottom wings 3, 103. The wings are foldable against a fuselage 4 when moved to the folded position, greatly reducing the area needed for storage of such aircraft. The fuselage has a top 41, bottom 42, front 43 and back 44. The first top wing 2 and the second top wing 21 are pivotably mounted on a top pivot pin 6 positioned on the top 41 of the fuselage 4 near a wing root 9. In a similar manner the first bottom wing 3 and second bottom wing 103 are pivotably mounted on a bottom pivot pin 26 positioned on the bottom 42 of the fuselage 4. Each pivot pin 6 is held in position with respect to the fuselage 4 as the wings pivot such that a distance between the top pivot pin and the bottom pivot pin is fixed (i.e., the wings do not translate) during movement from the stowed position to the deployed position. Each pivot pin may be provided with a counterbalance spring 8 biasing the wings toward the deployed position. Advantageously the fuselage surfaces top 41, bottom 42 are generally smooth in an area between the top pivot pin 6 and the bottom pivot pin 6 to reduce aerodynamic drag and eddy formation during operation of the aircraft. A locking element may be provided to resist relative pivotable motion of the wings with respect to the fuselage, that is, to hold the wing in the deployed position.

Each top wing 2, 21, is releasably coupled to a corresponding bottom wing 3, 103 via coupler 11. This advantageously allows for movement of the top wings independent of the movement of the bottom wings between the deployed position and the stowed position. The coupler can comprise a stabilizer 5, and a rudder 13 extending from the bottom wing to the corresponding top wing when the aircraft is in the deployed position. Each top wing 2, 21 may define a cutaway 12 (on a rearward side of each corresponding wing) allowing room for the coupler and flaps or other parts of the top wing. The coupler can comprise a wing locking pin 16 which extends from the stabilizer to engage a component of the top wing. The wing locking pin 16 can be secured in a channel 17 (in an element attached to the top wing) by a spring, pin or other locking mechanism. Bottom wings 3 and 103 may also be provided with a cutout 10 positioned generally at an end of each wing and generally adjacent a corresponding stabilizer 5 in part to allow space for each corresponding stabilizer 5 and for each rudder 13 to pivot about a vertical axis (i.e., an axis generally perpendicular to the length of the fuselage).

Figure 2:
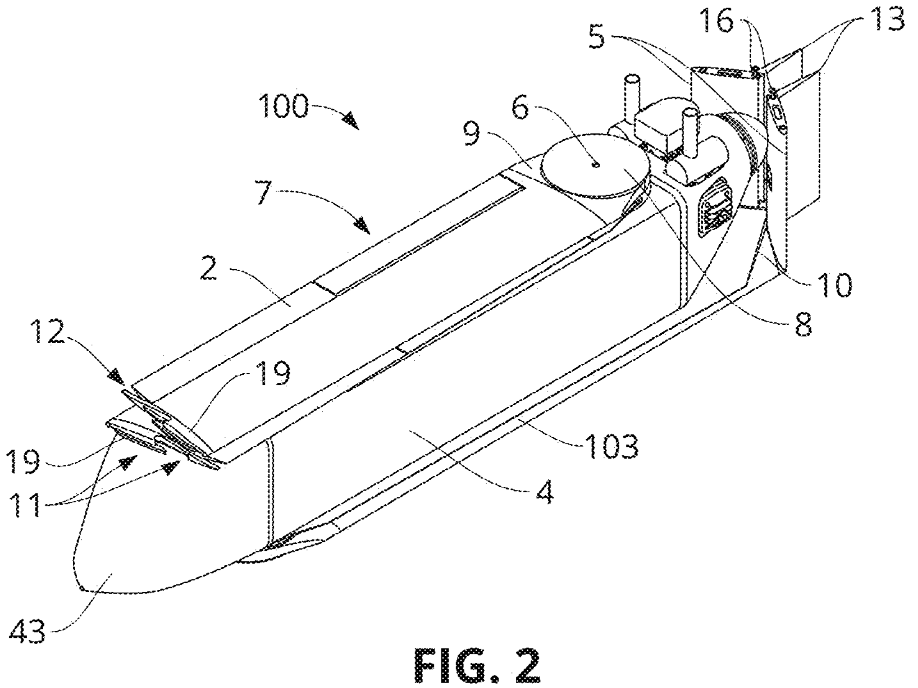
FIG. 2 is an isometric view of the folding wing aircraft of the embodiment of FIG. 1, shown in the stowed position.

FIG. 2 shows the folding wing aircraft 100 in the stowed position. The stowed position of a folding wing aircraft is generally understood to mean the position where the wings are folded in close to the fuselage to reduce storage area footprint of the aircraft. Ends of the top wings 2, 21 are generally adjacent the back 44 of the fuselage 4, and ends of the bottom wings 3, 103 generally adjacent the front 43 of the fuselage 4. Stabilizer 5 and rudder 13 are positioned on corresponding bottom wings and are positioned generally adjacent the back 44 of the fuselage in the stowed position. The stowed position advantageously allows for a significant reduction is area needed for storage of such aircraft. Optionally the positions of the top wings may be reversed with the positions of the bottom wings such that the top wings instead of the bottom wings are mounted closer to the front of the fuselage. Also the propeller may be mounted near the back or near the front.

Figures 3, 4, 5:
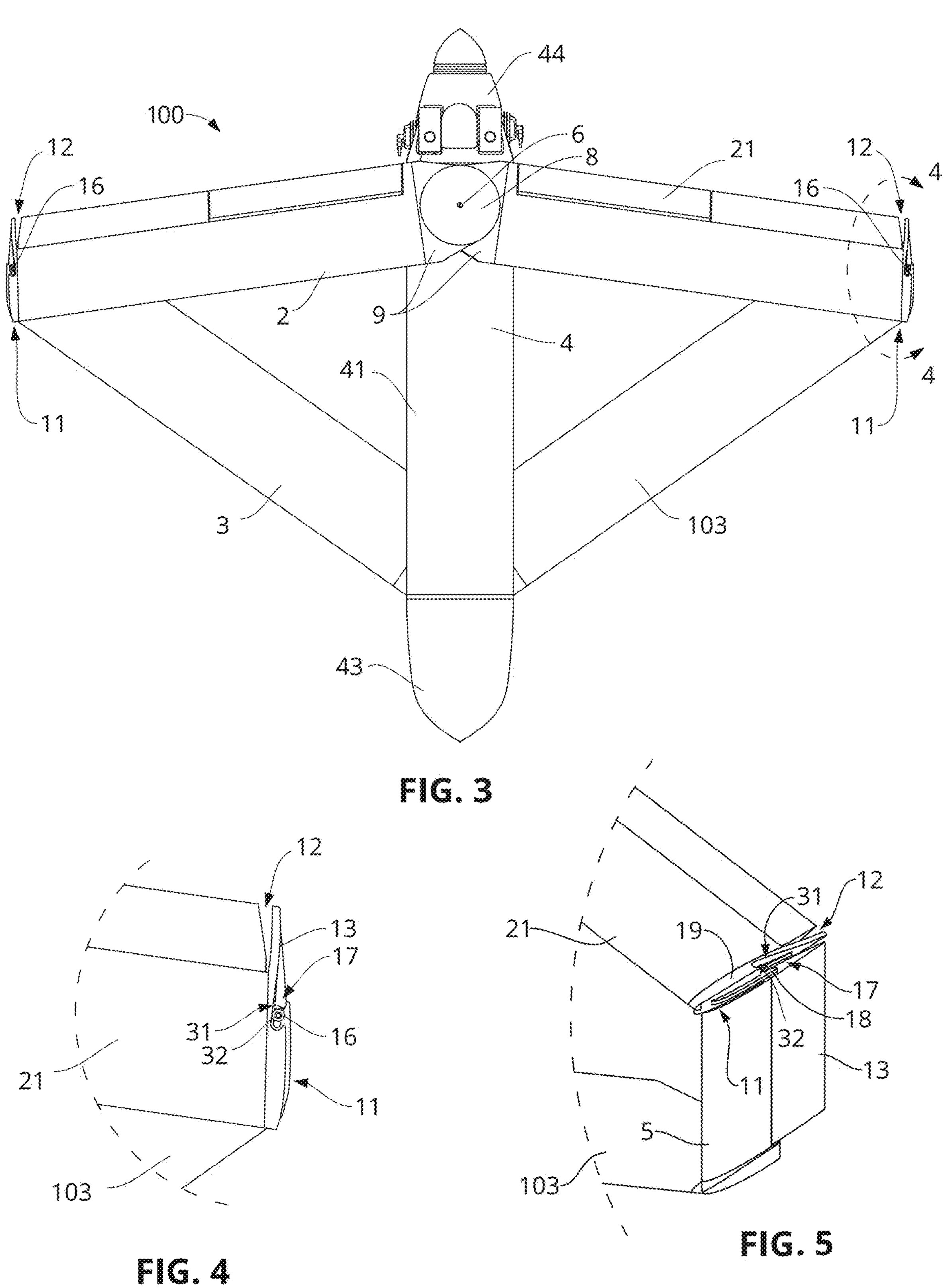
FIG. 3 is a top side view of the folding wing aircraft of the embodiment of FIG. 1, shown in the deployed position.
FIG. 4 is an isolated view of the coupling between one of the top wings and one of the bottom wings taken from 4-4 in FIG. 3.
FIG. 5 is an isolated isometric view of the coupling between one of the top wings and one of the bottom wings.

FIG. 3 is a top side view of the aircraft 100 of FIG. 1 in the top wings 2, 21 connected to corresponding wings 3, 103. This view shows the cutaways 12 of the top wings and a smooth top 41 of the fuselage 4.

FIG. 4 is a close-up of area 4-4 in FIG. 3 showing an option for a coupler 11 releasably connecting the wings 21, 103 together when the aircraft is in the deployed position. Ruder 13 and stabilizer 5 extend up from the bottom wing 103. Channel 17 receives the locking pin 16 and is secured in the channel releasably securing the top wing 21 to the bottom win 103. FIG. 5 shows an isolated isometric view with a receiving plate 18 attached to the top wing, with the receiving plate 18 defining the channel 17 and receiving the pin 16 to secure the wings together. A wing tip bracket 19 may be attached to the top wing 21 generally flush with the rest of the top wing. Wing tip bracket enhances aerodynamics and allows for a pocket 31 where a head 32 of the locking pin 16 is positioned. This embodiment advantageously allows for releasable engagement of the corresponding top wing to the stabilizer 5 (and therefore to the corresponding bottom wing).

Figure 6:
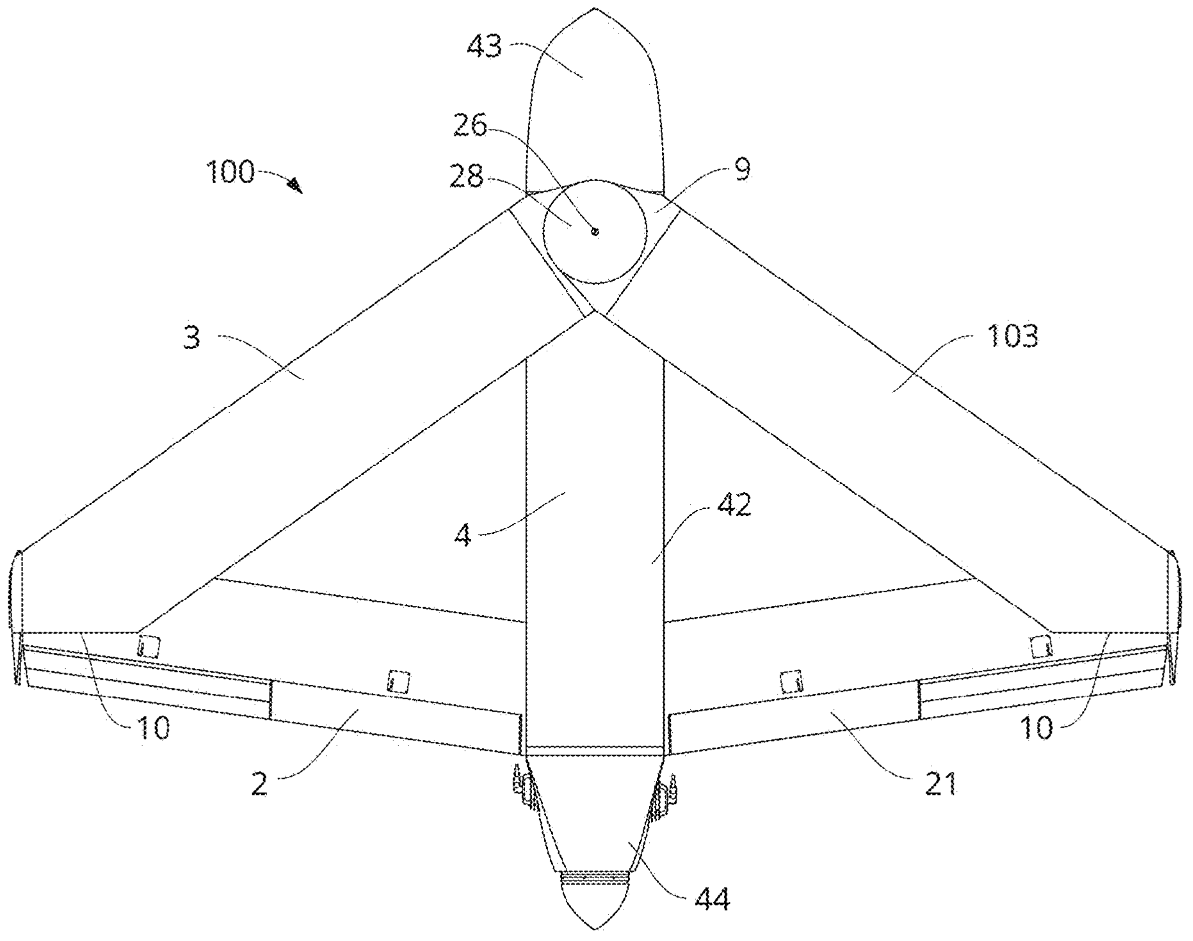
FIG. 6 is a bottom side view of the folding wing aircraft of the embodiment of FIG. 1, shown in the deployed position.

FIG. 6 is a bottom side view of the aircraft 100 showing a generally rhomboid shape of the wings 3, 103 and 2, 21 when the aircraft is in the deployed position. Smooth bottom 42 of fuselage 4 is visible, along with cutouts 10 generally near ends on a rearward side of the corresponding bottom wings 3, 103. Wing 3 and 103 are jointly pivotable about pivot pin 26 generally near the front 43 of the fuselage 4. The cutouts 10, one for each wing allow space for coupling between each one of the upper wings and each one of the corresponding lower wings.

Figure 7:
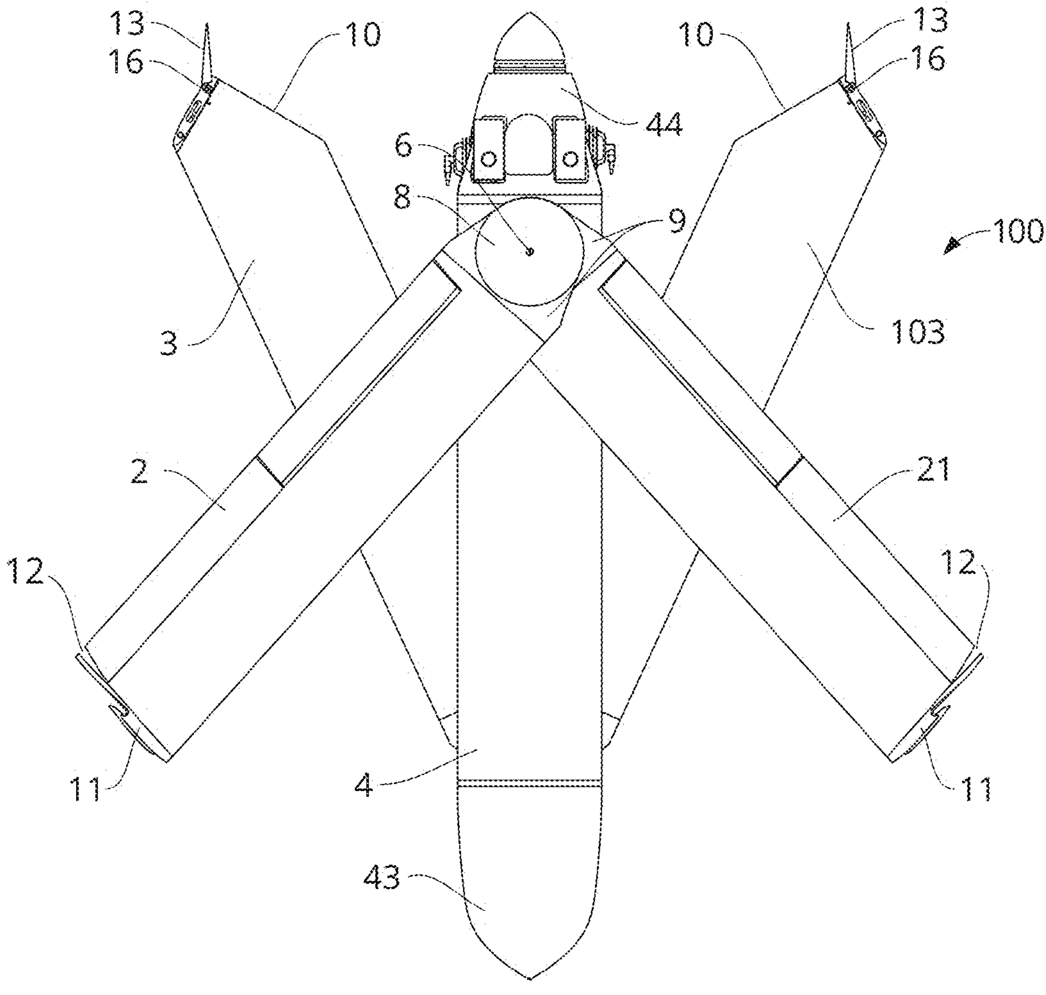
FIG. 7 is a top side view of the folding wing aircraft of the embodiment of FIG. 1, shown between the deployed position and the stowed position.

FIG. 7 is a top side view of the aircraft 100 between the deployed position and the stowed position. Stabilizers 5 are shown affixed to corresponding wings 3, 103, along with pins 16 and rudders 13. The wings 2, 21 are attached to the top 41 of the fuselage 4, and bottom wings 3, 103 are attached to the bottom 42 of the fuselage.

Persons of ordinary skill in the art, given the benefit of this disclosure, may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A folding wing aircraft having a deployed position and a stowed position, comprising, in combination:

a fuselage having a front and a back, and a top and a bottom;

a first top wing and a second top wing, wherein the first top wing and the second top wing are pivotable about a top pivot pin, wherein the top pivot pin is positioned on the top of the fuselage;

a first bottom wing and a second bottom wing, wherein the first bottom wing and the second bottom wing are pivotable about a bottom pivot pin, wherein the bottom pivot pin is affixed to the bottom of the fuselage; and a coupler releasably connecting the first top wing to the first bottom wing, wherein the coupler comprises a rudder, a stabilizer mounted on each one of the bottom wings, and a wing locking pin extending from the stabilizer and engaging a channel formed adjacent each corresponding top wing;

wherein a distance between the top pivot pin and the bottom pivot pin is fixed during movement from the stowed position to the deployed position.

2. The folding wing aircraft of claim 1 wherein the rudder and the stabilizer are positioned adjacent the back of the fuselage when in the stowed position.

3. The folding wing aircraft of claim 1 wherein each bottom wing defines a cutout portion generally adjacent the corresponding stabilizer.

4. The folding wing aircraft of claim 1 further comprising a receiving plate affixed to each of the top wings and defining the corresponding channel, wherein each wing locking pin is adapted to be received by the corresponding channel.

5. The folding wing aircraft of claim 4 further comprising a wing tip bracket affixed to each of the top wings, wherein each wing tip bracket has a surface flush with the corresponding top wing, and each wing tip bracket defines a pocket adapted to receive a head of the corresponding wing locking pin.

6. The folding wing aircraft of claim 1 wherein the top and the bottom of the fuselage are smooth in an area between the top pivot pin the bottom pivot pin.

* * * * *